US008296255B1

(12) United States Patent
Wawda

(10) Patent No.: US 8,296,255 B1
(45) Date of Patent: Oct. 23, 2012

(54) METHOD AND APPARATUS FOR AUTOMATICALLY CLASSIFYING AN UNKNOWN SITE TO IMPROVE INTERNET BROWSING CONTROL

(75) Inventor: Abubakar Wawda, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1022 days.

(21) Appl. No.: 12/142,520

(22) Filed: Jun. 19, 2008

(51) Int. Cl.
*G06F 17/00* (2006.01)
*G06F 15/173* (2006.01)
*G06N 5/02* (2006.01)

(52) U.S. Cl. .......................................... 706/48; 709/225
(58) Field of Classification Search .................. 706/12, 706/45, 48, 54; 709/202, 219, 225
See application file for complete search history.

(56) References Cited

U.S. PATENT DOCUMENTS

| | | | |
|---|---|---|---|
| 6,904,449 B1 * | 6/2005 | Quinones ..................... 709/203 |
| 2003/0110168 A1 * | 6/2003 | Kester et al. ..................... 707/6 |
| 2003/0225763 A1 * | 12/2003 | Guilak et al. ..................... 707/7 |
| 2004/0006621 A1 * | 1/2004 | Bellinson et al. ............. 709/225 |
| 2006/0253578 A1 * | 11/2006 | Dixon et al. ................... 709/225 |
| 2007/0245422 A1 * | 10/2007 | Hwang et al. ................... 726/26 |
| 2008/0214153 A1 * | 9/2008 | Ramer et al. ................ 455/414.1 |
| 2009/0300768 A1 * | 12/2009 | Krishnamurthy et al. ...... 726/26 |
| 2010/0058204 A1 * | 3/2010 | Wilson .......................... 715/760 |

OTHER PUBLICATIONS

Chakrabarti,S. et al. "Using Memex to archive and mine community Web browsing experience" Computer Networks, vol. 33, 2000. pp. 669-684.*
Morita,M. et al. "Information Filtering Based on User Behavior Analysis and Best Match Text Retrieval" 1994. pp. 272-281.*
Benz,D. et al. "Supporting collaborative hierarchical classification: Bookmarks as an example" Computer Networks, vol. 51, 2007. pp. 4574-4585. Available online: Jun. 27, 2007.*
Beal,T. et al. "Harnessing user communities for website location and evaluation." East Asian Library Resources Group of Australia Newsletter, No. 35, pp. 3-20. 1998.*
Greenfield,P. et al. "Effectiveness of Internet Filtering Software Products". Prepared for NetAlert and the Australian Broadcasting Authority. CSIRO Mathematical and Information Sciences. Sep. 2001. 90 pages.*
Caulkins,J.P. et al. "A method for managing access to web pages: Filtering by Statistical Classification (FSC) applied to text" Decision Support Systems, vol. 42, 2006. pp. 144-161. Available online: Jan. 18, 2005.*

* cited by examiner

*Primary Examiner* — Jeffrey A Gaffin
*Assistant Examiner* — Benjamin Buss
(74) *Attorney, Agent, or Firm* — Wilmer Cutler Pickering Hale and Dorr LLP

(57) ABSTRACT

A method and apparatus for automatically classifying an unknown web site to improve internet browsing control is described. In one embodiment, a method for classifying an unknown web site to control internet browsing comprising processing web site control data associated with at least one user that requested access to an unknown web site, wherein the web site control data comprises a web browsing behavior history and applying at least one metric to the web browsing behavior history to classify the unknown website.

17 Claims, 4 Drawing Sheets

METHOD AND APPARATUS FOR AUTOMATICALLY CLASSIFYING AN UNKNOWN SITE TO IMPROVE INTERNET BROWSING CONTROL

BACKGROUND OF THE INVENTION

1. Field of the Invention

Embodiments of the present invention, generally, relate to controlling internet activity. In particular, embodiments of the present invention relate to a method and apparatus for automatically classifying an unknown site to improve Internet browsing control.

2. Description of the Related Art

Internet browsing control software applications (e.g., parental control software applications) monitor Internet activity by one or more computer users. Under certain conditions (e.g., inappropriateness, security risk and/or the like), such Internet browsing control software applications may block access to a particular web site. The Internet browsing control software applications are used for various purposes, such as assessing employee productivity/trustworthiness, preventing children from viewing inappropriate web content, preventing disclosure of sensitive information and/or the like. For example, parents may use parental control software applications to monitor a child's internet activity in order to make sure the child does not visit any pornographic web site.

Although the parental control software applications monitor the child's web browsing and enable parents with some authority over which web sites the child can visit, there is a grey area between "bad" websites and "good" websites for various age groups. For example, www.cnn.com is considered a good, informative website for most age groups and www.playboy.com is clearly an inappropriate, bad website for all age groups, but an unknown web site is not clearly inappropriate or good because the unknown web site is not attributed to any preexisting reputation. Consequently, unknown web sites cannot be classified without an intense analysis of the web content. There are an increasing number of web sites that are unclassified or classified as unknown because such web sites are not on any web site category of the classification information.

The parental control software applications may use two methods in order to determine whether a web site is suitable to be viewed by children: a) analyze the web content while the child visits the web site (e.g. examine text for profanities, images for sexual images and/or the like) and b) compare the web site to classification information that includes categorizes for most web sites (e.g. www.disney.com is included in "Kids" category)). Any web site comprising inappropriate web content for a particular child's age group may be blocked by the parental control software application. Unfortunately, new web sites are unknown and thus, not listed or screened. The number of unknown web sites is large because there are thousands of new web sites created every day.

Existing parental control software applications are limited to the classification information when identifying "good" and "bad" web sites. As such, the existing parent control software applications do not provide a procedure for automatically classifying an unknown website. Often, third party organizations crawl the Internet and classify or rate "unknown" websites. Such third party organization license or sell such classification information, as well as periodic updates, to owners or venders of parental control software applications. If a web site is "unknown", then the third party organization has not provided the parental control software applications with a classification of the website. Consequently, the existing parental control software applications are unable to effectively control a child's browsing activity with respect to the unknown web site since the third party has not yet classified the unknown web site as "good" or "bad".

Occasionally, the parent control software applications blindly block or allow unknown web sites depending on a specification of various settings for the parental control software applications. As a result, some children may be allowed to visit inappropriate websites and some children may be blocked from viewing suitable web sites. For example, the unknown web site may be a legitimate website for news that the parental control software blocks the child from viewing. Vice versa, the unknown website may be a Phishing site, through which sensitive information might be acquired, or an adult site that the parent control software allows the child to view much to the displeasure of the parents. Either situation occurs simply because the unknown website has not yet been classified as "good" or "bad".

Therefore, there is a need in the art for a method and apparatus for automatically classifying an unknown web site for various age groups in order to improve Internet browsing control software applications.

SUMMARY OF THE INVENTION

The embodiments of the present invention generally provide a method and apparatus for automatically classifying an unknown web site to improve internet browsing control. In one embodiment, the method comprising processing web site control data associated with at least one user that requested access to an unknown web site, wherein the web site control data comprises a web browsing behavior history and applying at least one metric to the web browsing behavior history to classify the unknown website.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
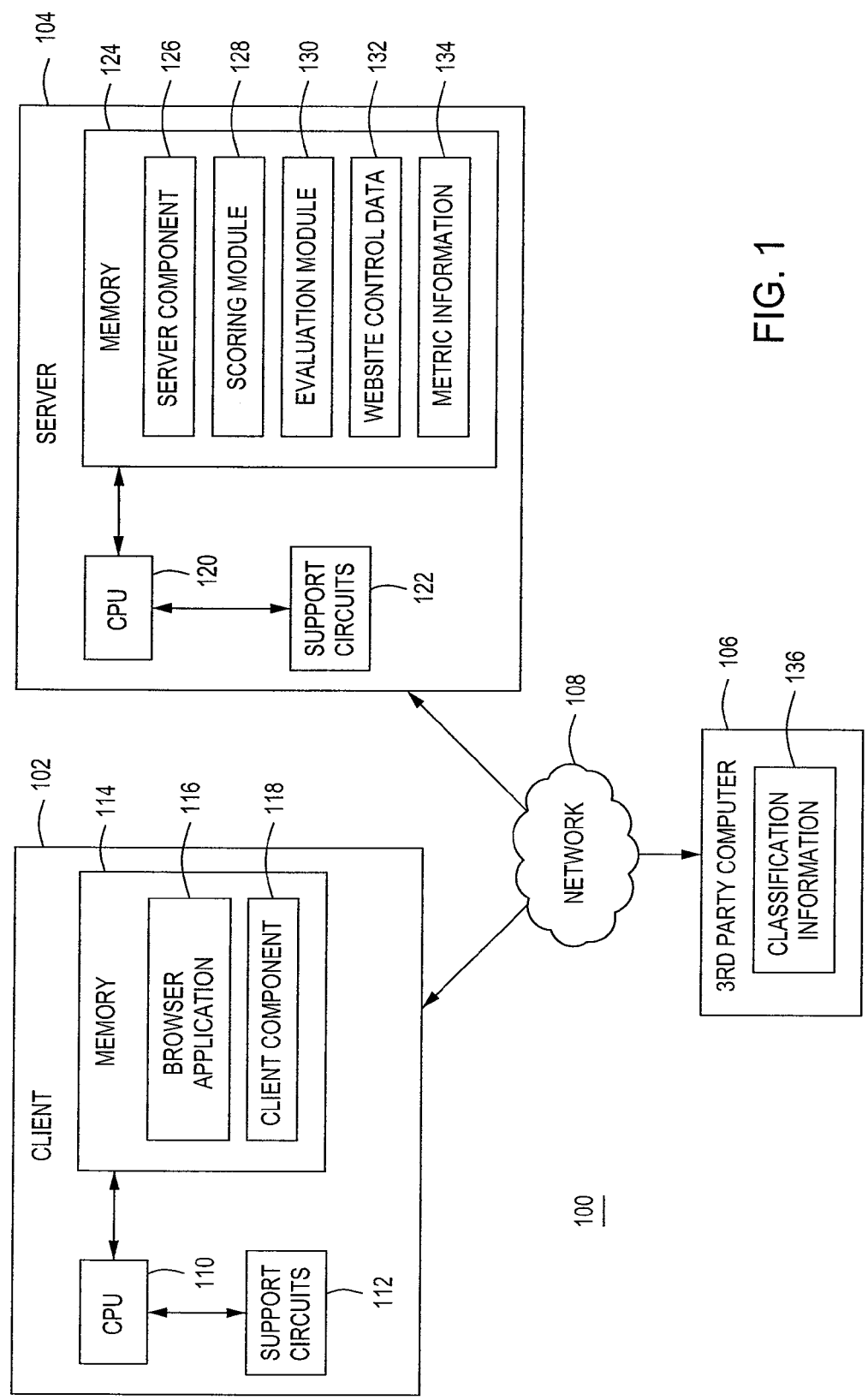
FIG. 1 is a block diagram of the system for automatically classifying an unknown web site according to one embodiment of the present invention.

To facilitate understanding, identical reference numerals have been used, where possible, to designate identical elements that are common to the figures. It is to be noted, however, that the appended drawings illustrate only typical embodiments of this invention and are therefore not to be considered limiting of its scope, for the invention may admit to other equally effective embodiments.

DETAILED DESCRIPTION OF THE DRAWINGS

FIG. 1 is a block diagram depicting a system 100 for automatically classifying an unknown website in accordance with one or more embodiments of the present invention. The system 100 includes a client 102, a server 104 and a third party computer 106 where each is coupled to each other through a network 108.

The client 102 is a computing device (e.g., laptop, a desktop, a PDA (Personal Digital Assistant), a mobile phone and the like) that comprises a central processing unit (CPU) 110, various support circuits 112 and a memory 114. The central processing unit 110 includes one or more commercially available microprocessors or microcontrollers that facilitate data processing and storage. The various support circuits 112 facilitate operation of the CPU 110 and may include clock circuits, buses, power supplies, input/output circuits and the like. The memory 114 in which data and programs are stored includes a read only memory (ROM), random access memory (RAM), disk drive storage, optical storage, removable storage and the like. The memory 114 further includes various software packages, such as a browser application 116 and a client component 118.

The server 104 comprises a central processing unit (CPU) 120, various support circuits 122 and a memory 124. The central processing unit 120 includes one or more commercially available microprocessors or microcontrollers that facilitate data processing and storage. The various support circuits 122 facilitate operation of the CPU 120 and may include clock circuits, buses, power supplies, input/output circuits and the like. The memory 124 in which data and programs are stored includes a read only memory (ROM), random access memory (RAM), disk drive storage, optical storage, removable storage and the like. The memory 124 further includes various software packages, such as a server component 126, a scoring module 128 and an evaluation module 130. The memory further includes various data, such as web site control data 132 and metric information 134.

The third party computer 106 is a computing device that comprises classification information 136. Generally, the third party computer 106 is configured to provide Internet browsing control software applications with the classification information 136 (e.g., classifications of numerous web sites across the Internet). For example, the classification information 136 may indicate that "www.cnn.com" presents appropriate content. The classification 136 may also indicate that "www.cnn.com" is a suitable web site to visit for children older than ten years old. In one embodiment, the classification information 136 indicates a category for each web site. For example, the classification information 136 may indicate that www.cnn.com is classified under a "News" category and "www.disney.com" is classified under a "Kids" category. In another embodiment, the third party computer 106 may license the classification information 136 including periodic updates for newly created web sites to the Internet browsing control software applications. For example, the third party computer may communicate the classification information 136 to the server 104 to facilitate a parental control software application.

Generally, the browser application 116 comprises software code for navigating the Internet (e.g., visiting one or more web sites and viewing web content). The client component 118 comprises software code for implementing a client portion of an internet browsing control software application (e.g., a parental control software application). In one embodiment, the client component 118 may also be a component of the browser application 116 (e.g., a plug-in application). In another embodiment, the client component 118 is an application that monitors HTTP (HyperText Transfer Protocol) communications between the browser application 116 and the one or more web sites.

The server component 126 cooperates with the client component 118 to monitor and filter web content at the client 102 by blocking inappropriate web content from the client 102. For example, a user of the client 102 (e.g., a child) may navigate to a particular web site for which a Universal Resource Locator (URL) is communicated to the server component 126 for evaluation. If the server component 126 determines that the particular web site includes inappropriate web content and communicates the same, the client component 118 blocks access to the particular web site, which prevents the inappropriate web content from being viewed at the client 102 by the user. In one embodiment, the server component 126 compares the URL with the classification information 136. Such a comparison may indicate a classification for the particular web site, such as "Appropriate or Inappropriate". Alternatively, such a comparison may not produce a classification for the particular web site because the particular web site is new and/or unclassified by the third party computer 106. Accordingly, the particular web site is "classified" as an unknown web site.

In yet another embodiment, the server component 126 and the client component 118 cooperate to warn the user of the client 102 that the particular web site is classified as an inappropriate and/or is to be blocked. The user of the client 102 may choose to ignore the warning and proceed to view the particular web site or may choose to heed the warning and stop any current attempt to view the particular web site. If the user of the client 102 chooses to ignore the warning, the web site control data 132 is updated to indicate that the warning was ignored and the particular web site was accessed. In another embodiment, the server component 126 and the client component 118 cooperate to prompt the user of the client 102 with an option to request permission to access the particular web site. If an authority (e.g., a parent) grants permission, the user of the client 102 is permitted to access the particular web site. Accordingly, the web site control data 132 is updated to include such a grant of permission.

Generally, the web site control data 132 includes information associated with various operations of the server component 126 and the client component 118 of the Internet browsing control software application. In one embodiment, the web site control data 132 includes a history of monitored and controlled internet activity (i.e., web browsing behavior history). For example, the web site control data 132 indicates one or more web sites accessed or requested by one or more clients, such as the client 102. Over a period of time, the server component 126 and the client component 118 may have permitted access to some of the one or more web sites and/or blocked access to other ones of the one or more web sites. As such, the web site control data 132 indicates the one or more permitted web sites and/or the one or more blocked web sites. In another embodiment, the web site control data 132 includes a specification of one or more factors associated with Internet browsing control (e.g., parental control), such as a threshold for scoring unknown web sites, one or more web sites that are to be always blocked, one or more web sites that are to override any negative classification and/or the like.

According to one or more embodiments of the present invention, the server component 118 cooperates with the scoring module 128 to automatically classify an unknown web site. In one embodiment, the server component 126 supplies a URL for the unknown web site to the scoring module 128 subsequent to the comparison with the classification information 136. Then, the scoring module 128 accesses the metric information 134 and applies one or more metrics to the web control data 132. Subsequently, the scoring module 128 computes a score that indicates whether the unknown web site is to be blocked or permitted. The computed score is returned to the server component 126 for examination. The server component 126 blocks or permits access to the unknown web site by the user of the client 102 based on such an examination.

In one or more embodiment, the application of a metric to the web site control data 132 may require an evaluation of the user of the client 102. Hence, the server component 126 and the scoring module 128 cooperate with the evaluation module 130 to perform such an evaluation. The evaluation module 130 comprises software code for correlating the web site control data 132 with respect to the user of the client 102 (e.g., a child). For example, a metric used by a parental control software application may require an evaluation of a web browsing behavior history of a child to determine if the child has indicia of "good behavior" or indicia of "bad behavior". In some embodiment, the evaluation module 130 may correlate the web site control data 132 with an identifier for the child to determine that the web site control data 132 does not indicate "good behavior" or "bad behavior". Thus, the web site control data 132 is inconclusive as to whether the child exhibits "good behavior" or "bad behavior". As such, the child may simply exhibit "normal behavior" according to one embodiment.

Generally, the metric information 134 comprises information regarding one or more metrics for automatically classifying the unknown web site. The one or more metrics may be based on various factors, such as age groups, web content, a specification (e.g., a parental control specification), a web browsing behavior history of other users (e.g., other children) and/or the like. In one embodiment, a web browsing behavior history of a child is correlated with a reaction of a parent to the respective web browsing behavior. Such a history is used to identify a number of inappropriate web sites to which the child attempted to access or was permitted access after a warning was ignored or permission was granted.

According to various embodiments, the one or more metrics are applied to the web site control data 132 to automatically classify the unknown website in order to control access by children. As mentioned above, the web site control data 132 includes information describing one or more attempts to access the unknown web site by the children. In one embodiment, a first metric is defined as a number of children having indicia of "good behavior" and have tried to access the unknown site. The indicia of "good behavior" may be defined in a context of the parental control software application. For example, the indicia of "good behavior" may be attempting to visit fewer than two inappropriate web sites per month as indicated by the web site control data 132. According, a child that is blocked from only two web sites per month exhibits "good behavior". If a significant number of children having the indicia of "good behavior" visit the unknown web site, then there is a strong likelihood that the unknown web site is appropriate.

In another embodiment, a second metric that may be applied to web site control data 132 is defined as a percentage of children that have the indicia of "good behavior" and have tried to access the unknown web site versus a percentage of children who have indicia of "bad behavior" and have tried to access the unknown web site. Basically, the second metric compares children with "good behavior" against children with "bad behavior" with respect to the unknown web site. For example, if the unknown web site is popular with the children with the indicia of 'bad behavior' but is not popular with the children with the indicia of 'good behavior' (e.g., no visits from such children), then there is a strong likelihood that the unknown web site is inappropriate.

In another embodiment, a third metric is defined as a number of children for which access to the unknown web site was denied and permission from a parent to access the unknown site was requested. Alternatively, the third metric may define a percentage of children instead of the number of children. As mentioned above, the parental control software application may include a feature that allows a child to electronically request permission (e.g., an email or an instant message) to access a site that was blocked as inappropriate. Generally, a child is significantly less likely to request permission from the parent to visit the blocked site that he/she knows is inappropriate and should not be visiting. Accordingly, if a significant number of children requested permission after being denied, there is a strong likelihood that the unknown web site is appropriate. Conversely, if a significant number of children did not request permission after being denied, there is a strong likelihood that the unknown web site is inappropriate.

In a further embodiment, a fourth metric is defined as a number of children that were issued a warning after attempting to access the unknown web site, but subsequently, ignored the warning. Alternatively, the fourth metric may define a percentage of children instead of the number of children. As mentioned above, the parental control software application may be include a feature (i.e., a "soft-block" mode) where a warning is issued when a child attempts to access a site that would ordinarily be blocked. The child, however, may be permitted to access the site as long as a parent is notified. Generally, a child is significantly less likely to notify the parent with respect to visiting the site if the child knows that the site is inappropriate. Accordingly, if a significant number of children ignored the warning and notified the parent anyway, there is a strong likelihood that the unknown web site is appropriate. Conversely, if a significant number of children decided against notifying the parent, there is a strong likelihood that the unknown web site is inappropriate.

In yet another embodiment, a fifth metric is defined as a number of parents that explicitly permit a child to access the unknown web site as indicated in the web site control data 132. A parent may manifest such permission by adding the unknown web site to an override list or approving an electronic request from the child. Generally, the parent is significantly less likely to explicitly permit the child to access an inappropriate web site. Accordingly, if a significant number of parents explicitly permit access to the unknown web site, there is a strong likelihood that the unknown web site is appropriate. Alternatively, the fifth metric may define a percentage of parents instead of the number of parents.

In another embodiment, a sixth metric is defined as a number of parents that explicitly denied access to the unknown site by a child as indicated in the web site control data 132. A parent may manifest such a denial by adding the unknown web site to an always block list or by disapproving an electronic request from the child. Generally, the parent is significantly more likely to explicitly deny access to an inappropriate web site. Accordingly, if a significant number of parents explicitly deny access to the unknown web site, there is a strong likelihood that the unknown web site is inappropriate. Alternatively, the sixth metric may define a percentage of parents instead of the number of parents.

According to one embodiment, the scoring module 128 applies any combination of the above mentioned metrics to the web site control data in order to classify the unknown web site. The scoring module 128 determines a value (i.e., a number or percent) for each of the applied metrics. In one embodiment, the scoring module 128 multiplies each value by a corresponding weight to produce a weighted value. The weighted values are added together to compute a score for classifying the unknown web site. The server component 118 may compare such a score to a threshold (e.g., a numerical value or percent). For example, if the score is below the threshold, the unknown web site may be classified as appropriate. Conversely, if the score is above the threshold, the unknown web site may be classified as inappropriate. In addition, the threshold and/or the corresponding weights may be defined by a parent or generated through a machine learning technique (e.g., a Bayesian classifier trained with appropriate and inappropriate web sites). Furthermore, the applied metrics may be specific to children of a same age group (or other demographic).

Figure 2:
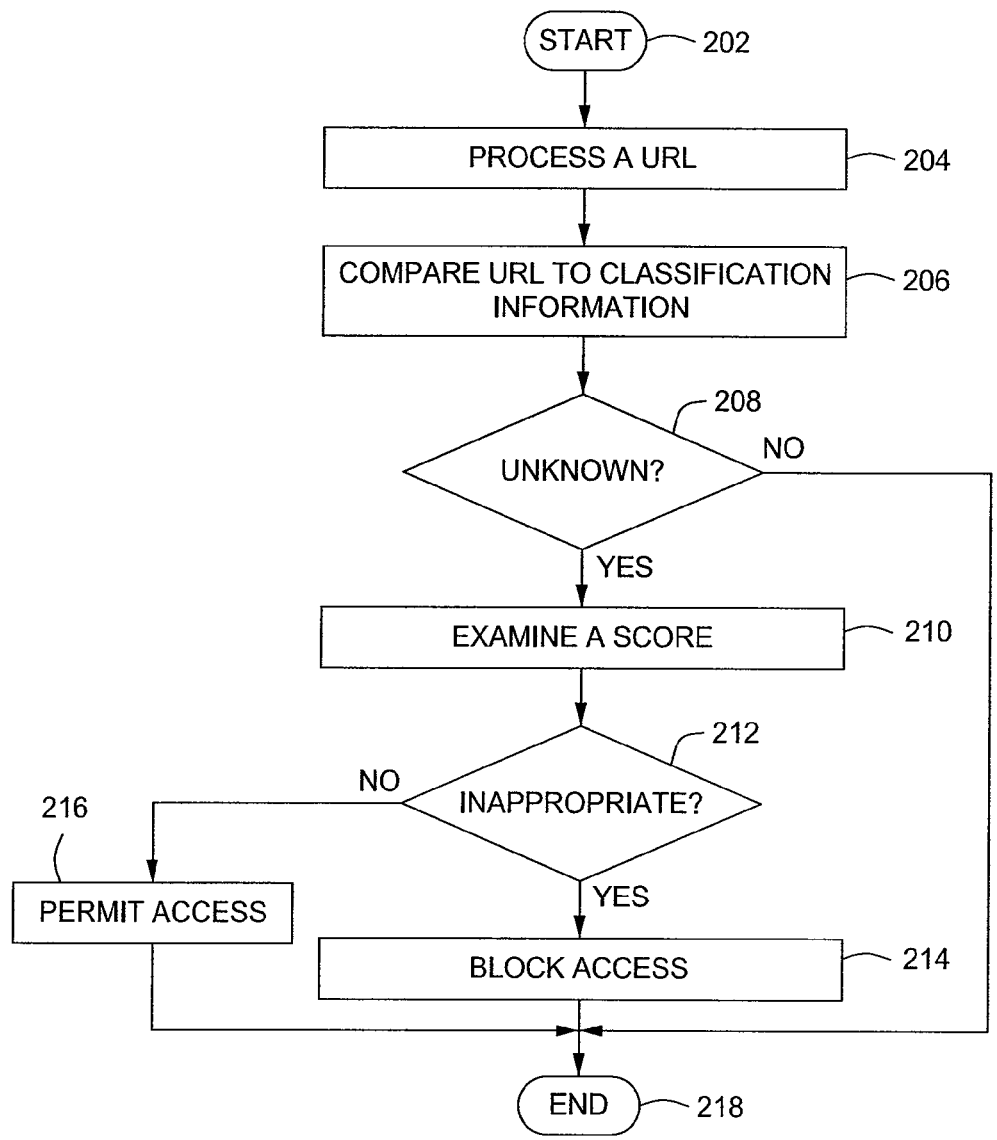
FIG. 2 is a flow diagram of a method for automatically classifying an unknown web site according to one embodiment of the present invention.

FIG. 2 is a flow diagram of a method for automatically classifying an unknown web site according to one embodiment of the present invention. The method 200 begins at step 202 and continues to step 204 where a URL (Uniform Resource Locator) for web site is processed.

At step 206, the URL is compared to classification information as described above. In one embodiment, the URL is compared to categories of web groups. A determination is made, at step 208, as to whether the web site is unknown (i.e., not classified in the classification information). If it is determined that the web site is unknown, the method 200 proceeds to step 210. If it is determined that the web site is known and previously classified, the method 200 proceeds to step 218.

At step 210, a score for classifying the unknown web site is examined. At step 212, a determination is made as to whether the unknown web site is inappropriate. If it is determined that the unknown web site is inappropriate, the method 200 proceeds to step 214. At step 214, access to the unknown web site is blocked. If it is determined that the unknown web site is not inappropriate, the method 200 proceeds to step 216. At step 216, access to the unknown web site is permitted. At step 218, the method 200 ends.

Figure 3:
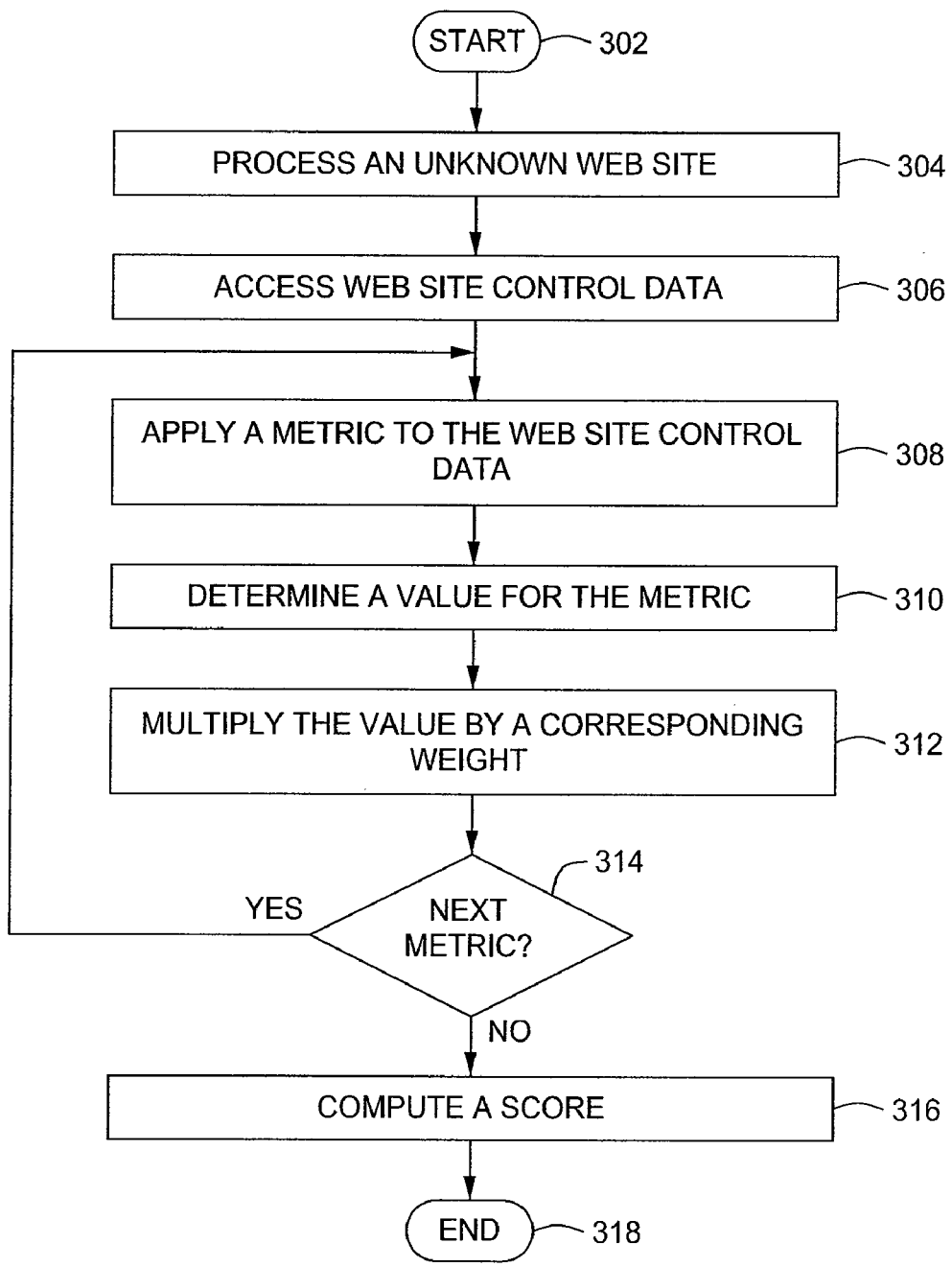
FIG. 3 is a flow diagram of a method for applying at least one metric to web site control data to compute a score for classifying an unknown web site according to one embodiment of the present invention.

FIG. 3 is a flow diagram of a method for applying at least one metric to web site control data to compute a score for classifying an unknown web site according to one embodiment of the present invention. The method 300 starts at step 302 and continues to step 304.

At step 304, an unknown web site is processed. At step 306, web site control data is accessed. At step 308, a metric is applied to the web site control data. At step 310, a value (e.g., a number or a percentage) for the metric is determined. At step 312, the value is multiplied by a corresponding weight. At step 314, a determination is made as to whether there is a next metric. If it is determined that there is a next metric, the method 300 returns to step 308. If it is determined that there are no more metrics to be applied, the method 300 proceeds to step 316. At step 316, a score for classifying an unknown web site is computed. At step 318, the method 300 ends.

Figure 4:
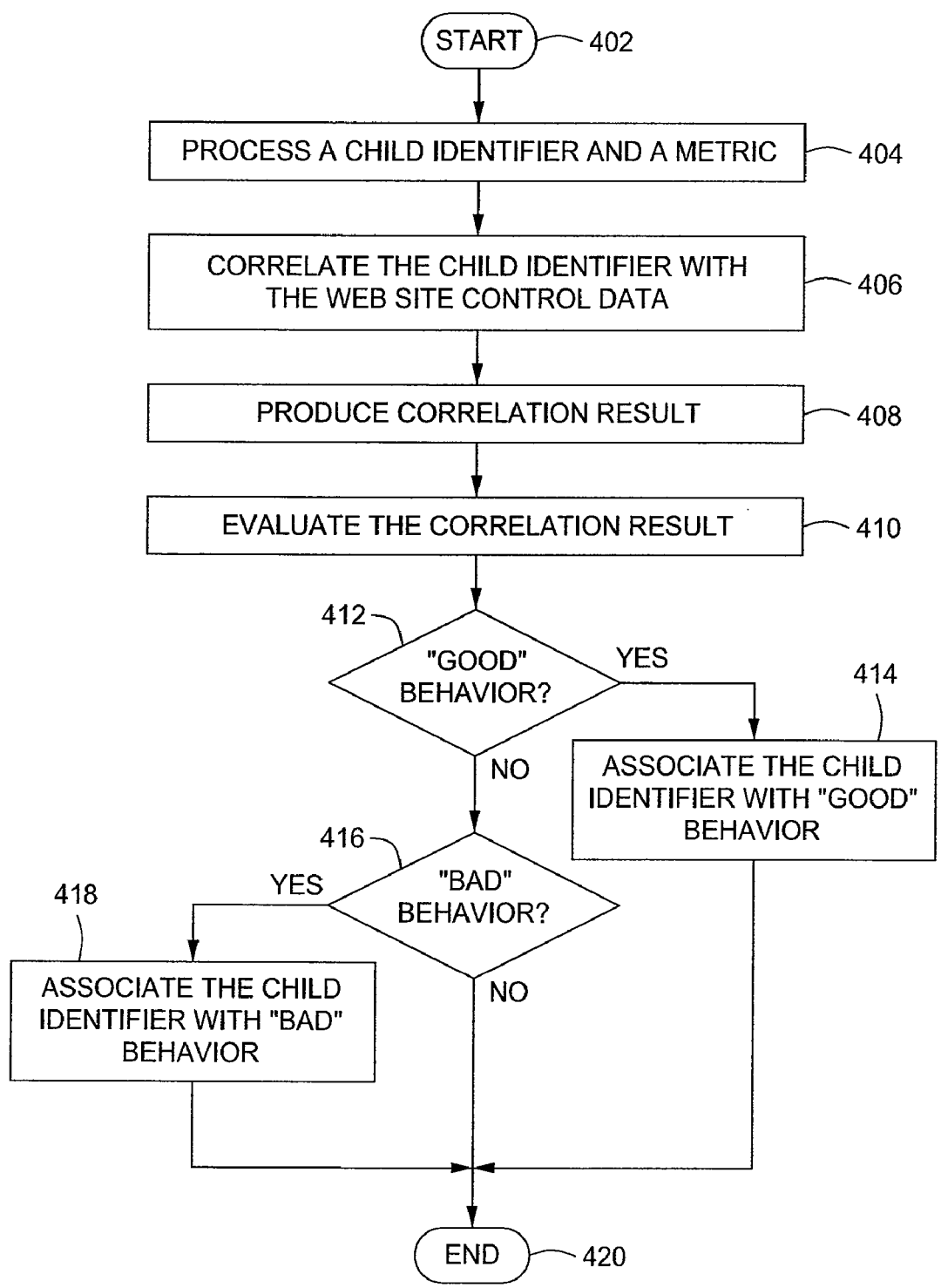
FIG. 4 is a flow diagram of a method for evaluating a web browsing behavior of a child to improve a parental control software application according to one embodiment of the present invention.

FIG. 4 is a flow diagram of a method 400 for evaluating a web browsing behavior of a child to improve a parental control software application according to one or more embodiments of the present invention. The method 400 starts at step 402 and continues to step 404.

At step 404, a child identifier and a metric is processed. At step 406, the child identifier is correlated with the web site control data. At step 408, a correlation result is produced. At step 410, the correlation result is evaluated. At step 412, a determination is made as to whether the child has indicia of "good behavior". If it is determined that the child has indicia of "good behavior", the method 400 proceeds to step 414. At step 414, the child identifier is associated with the indicia for "good behavior". If it is determined that the child does not have indicia of "good behavior", the method 400 proceeds to step 416. At step 416, a determination is made as to whether the child has indicia of "bad behavior". If it is determined that the child has indicia of "bad behavior", the method 400 proceeds to step 418. At step 418, the child identifier is associated with the indicia for "bad behavior". If it is determined that the child does not have indicia of "bad behavior", the method 400 proceeds to step 420. At step 420, the method 400 ends.

While the foregoing is directed to embodiments of the present invention, other and further embodiments of the invention may be devised without departing from the basic scope thereof, and the scope thereof is determined by the claims that follow.

The invention claimed is:

1. A method for classifying an unknown web site to control internet browsing, comprising:

processing, using at least one computer processor, web site control data associated with at least one user that requested access to the unknown web site, wherein the web site control data comprises a web browsing behavior history; and applying at least one metric to the web browsing behavior history to classify the unknown website, wherein applying the at least one metric further comprises correlating a user identifier with the web browsing behavior history to produce a correlation result, wherein the correlation result comprises one or more indicia to describe a relationship of the user identifier with the web browsing behavior, and wherein the one or more indicia comprises at least one of an indicium of good behavior, an indicium of bad behavior, and an indicium of normal behavior.

2. The method of claim 1, wherein applying the at least one metric further comprises identifying a portion of the web browsing behavior history that indicates a web browsing behavior of a user of the at least one user.

3. The method of claim 1, wherein correlating the user identifier with the web browsing behavior history further comprises evaluating the correlation result in accordance with a metric of the at least one metric to determine indicia of a web browsing behavior associated with the user identifier.

4. The method of claim 1, wherein correlating the user identifier with the web browsing behavior history further comprises correlating internet activity of a child with a reaction by a parent of the child.

5. The method of claim 1, wherein applying the at least one metric further comprises determining at least one value for the at least one metric.

6. The method of claim 5, wherein determining the at least one value further comprising:

multiplying the at least one value by at least one corresponding weight to produce at least one weighted value; and adding the at least one weighted value to compute a score for classifying the unknown web site.

7. The method of claim 5, wherein determining the at least one value further comprises computing a score for classifying the unknown web site using the at least one value.

8. The method of claim 7, wherein computing the score for classifying the unknown web site further comprises comparing the score to a pre-defined threshold to determine a classification of the unknown web site.

9. The method of claim 8 further comprising blocking access to the unknown web site, wherein the unknown web site is classified as inappropriate.

10. The method of claim 1 further comprising training a machine learning technique using the classification of the unknown website.

11. An apparatus for classifying an unknown web site to control internet browsing, comprising:
- a memory comprising metric information regarding at least one metric for classifying the unknown web site based on a web browsing behavior history of at least one user that requested access to the unknown web site;
- a scoring module for applying the at least one metric to web site control data to compute a score for classifying the unknown web site, wherein the web site control data comprises the web browsing behavior history; and
- an evaluation module for correlating the web browsing behavior history with a user of the at least one user to produce a correlation result, wherein the correlation result comprises one or more indicia to describe a relationship of the user identifier with the web browsing behavior, and wherein the one or more indicia comprises at least one of an indicium of good behavior, an indicium of bad behavior, and an indicium of normal behavior.

12. The apparatus of claim 11, wherein the evaluation module determines indicia of a web browsing behavior of the user of the at least one user based on the correlation result.

13. The apparatus of claim 11 further comprising a component of an internet browsing control software application for examining the score for classifying the unknown web site.

14. The apparatus of claim 13, wherein the component compares the score for classifying the unknown web site with a pre-defined threshold to determine a classification for the unknown web site.

15. The apparatus of claim 11, wherein the scoring module multiplies at least one value with at least one corresponding weight to produce at least one weighted value and computing the score for classifying the unknown web site using the at least one weighted value.

16. A system for classifying an unknown web site to control internet browsing, comprising:
- a server, comprising:
  - a server component of an internet browsing control software application, wherein the server component processes a Uniform Resource Locator (URL) of the unknown web site, wherein at least one user requested access to the unknown web site,
  - a scoring module for applying at least one metric to web site control data associated with the at least one user to compute a score for classifying the unknown web site, wherein the web site control data comprises web browsing behavior history, and
  - an evaluation module for correlating the web browsing behavior history with a user of the at least one user to produce a correlation result, wherein the correlation result comprises one or more indicia to describe a relationship of the user identifier with the web browsing behavior, and wherein the one or more indicia comprises at least one of an indicium of good behavior, an indicium of bad behavior, and an indicium of normal behavior; and
- a client computer, comprising:
  - a client component of the internet browsing control software application, wherein the client component communicates the Uniform Resource Locator (URL) of the unknown web site to the server component.

17. The system of claim 16, wherein the server component compares the score for classifying the unknown web site with a pre-defined threshold to determine a classification for the unknown website.

* * * * *